United States Patent [19]

Ryan

[11] Patent Number: 4,993,765
[45] Date of Patent: Feb. 19, 1991

[54] MOTOR VEHICLE BODY PROTECTOR

[76] Inventor: Timothy Ryan, P.O. Box 690957, Tulsa, Okla. 74169-0957

[21] Appl. No.: 433,200

[22] Filed: Nov. 8, 1989

Related U.S. Application Data

[63] Continuation-in-part of Ser. No. 204,229, Aug. 25, 1988, abandoned.

[51] Int. Cl.$^5$ .................... B60R 19/38; B60R 19/42
[52] U.S. Cl. .................... 293/127; 293/151; 293/155
[58] Field of Search ............ 293/126, 127, 128, 151, 293/149, 155, 154, 122, 114, 102, 30, 21; 296/188, 189, 198, 205, 207

[56] References Cited

U.S. PATENT DOCUMENTS

| | | | |
|---|---|---|---|
| 1,783,934 | 12/1930 | Banschbach | 293/127 |
| 1,793,680 | 2/1931 | Cooke | 293/127 |
| 2,785,921 | 3/1957 | Berenyi | 293/127 |
| 3,738,695 | 6/1973 | McBee | 293/128 |
| 4,437,697 | 3/1984 | Hinojos | 293/128 |
| 4,648,644 | 3/1987 | Swanson et al. | 293/128 |

FOREIGN PATENT DOCUMENTS

| | | | |
|---|---|---|---|
| 663329 | 8/1929 | France | 293/55 |
| 1095808 | 6/1955 | France | 293/127 |

Primary Examiner—Robert P. Olszewski
Assistant Examiner—Mark T. Le
Attorney, Agent, or Firm—William S. Dorman

[57] ABSTRACT

A vehicle side protector which comprises a plurality of detachable interconnected rods forming a side bumper which extends along at least a portion of the length of a side of a vehicle at a distance outward from the vehicle. The protector is particularly useful for protecting the sides of a car, truck, or van from being damaged as a result of the impact often caused by other vehicle doors in parking lots.

1 Claim, 2 Drawing Sheets

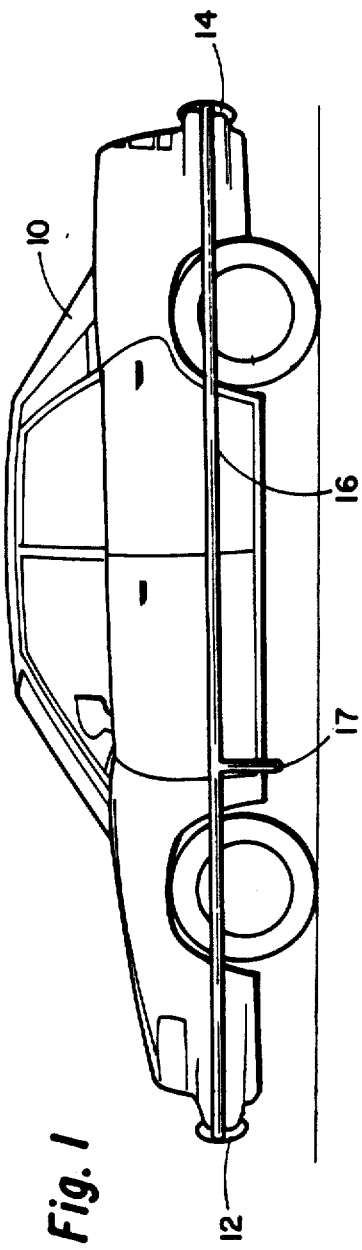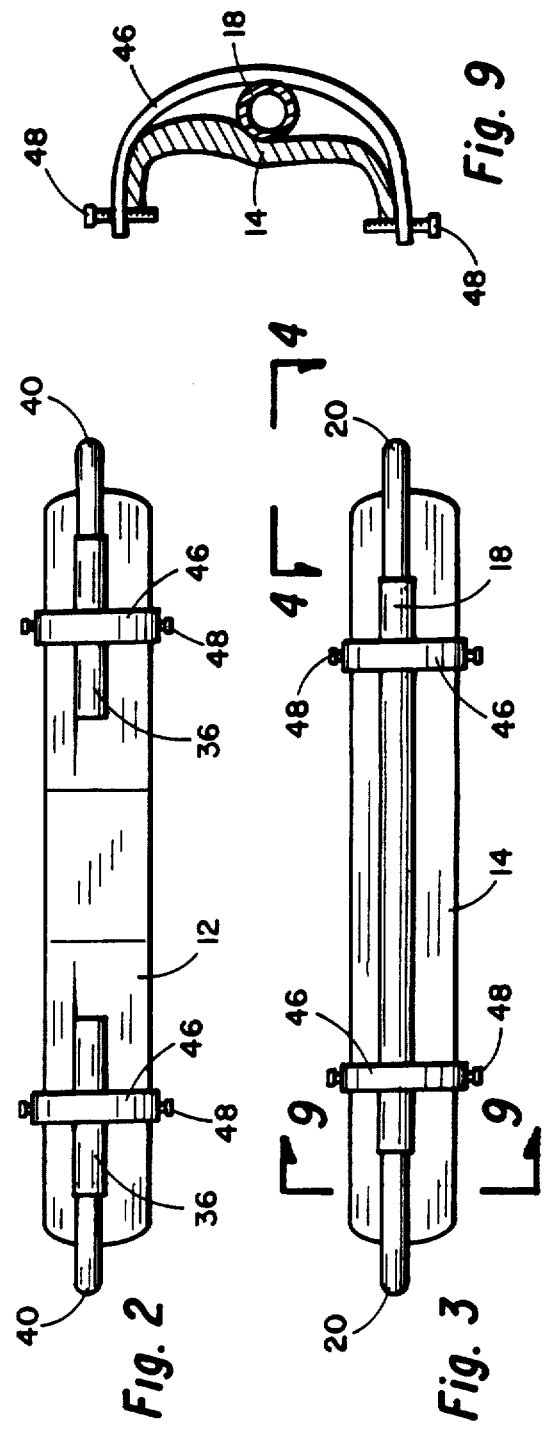

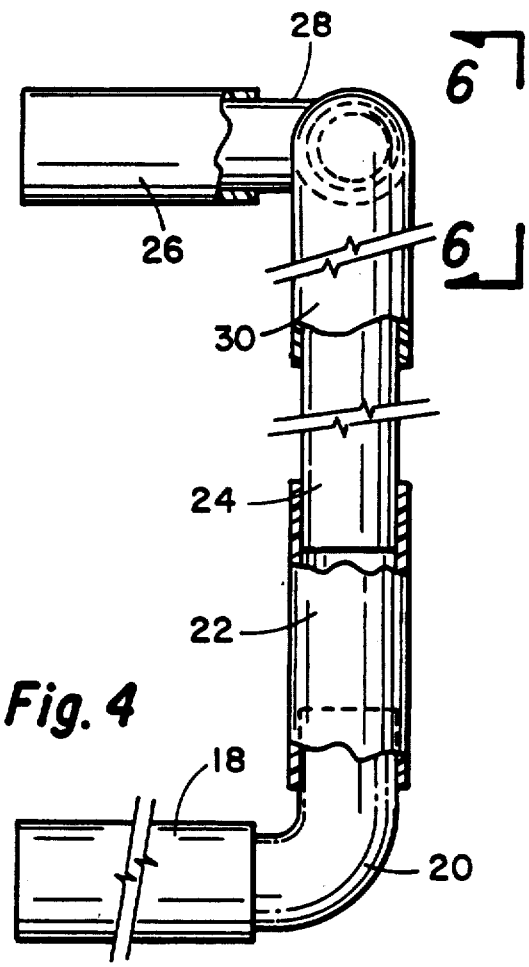
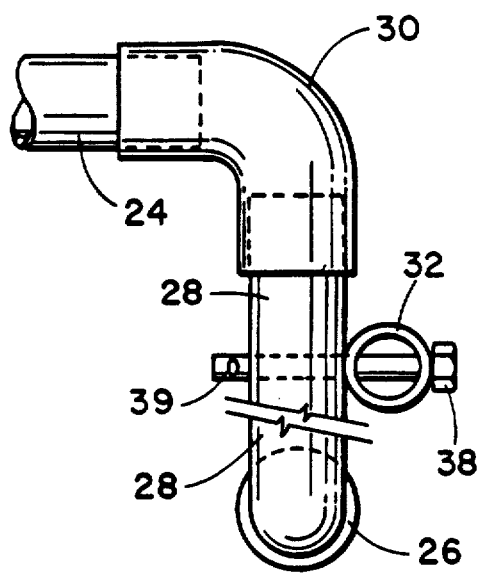
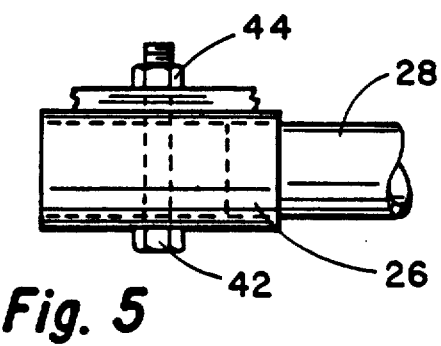
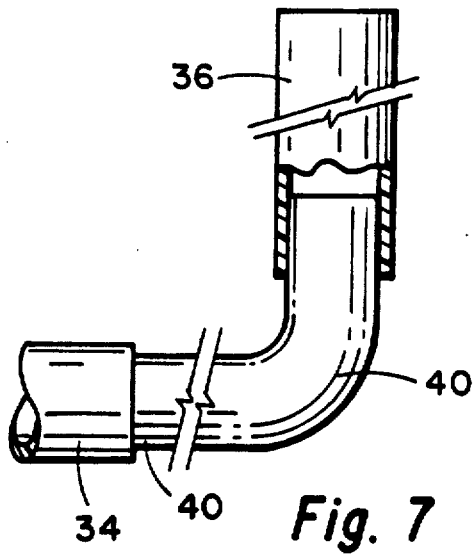
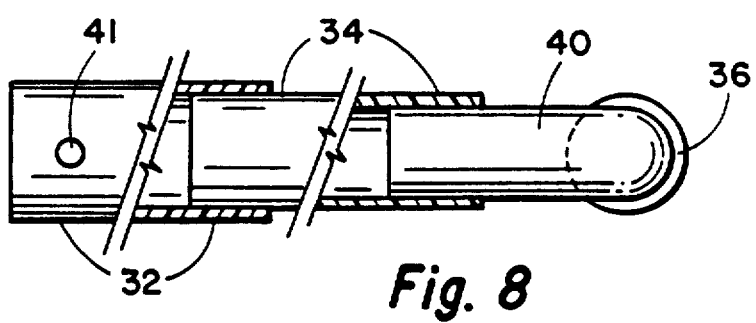

MOTOR VEHICLE BODY PROTECTOR

This application is a continuation-in-part of my prior copending application Ser. No. 07/204,299 filed on Aug. 25, 1988 entitled "CAR, TRUCK, VAN EXTRA BODY PROTECTORS", now abandoned.

BACKGROUND OF THE INVENTION

1. Field of the Invention

The present invention relates to a body protector for a motor vehicle. More particularly, the present invention involves an assembly of tubular elements which are interconnected with each other and which are attached to the front and rear bumpers and to the side of the vehicle to protect the body of the vehicle from possible damage that might be sustained in parking lots by the opening of doors on adjacent vehicles.

2. The Prior Art

It is well recognized that when one parks his vehicle in a parking lot he risks the possibility of damage to the doors and sides of his vehicle as a result of someone opening a door on an adjacent parked vehicle and striking the doors or other body parts of the first person's vehicle.

Applicant is aware of the following listed United States Patents:

| | | |
|---|---|---|
| Price | 1,643,517 | September 27, 1927 |
| Lusse | 1,754,112 | April 8, 1930 |
| Beane | 1,804,304 | May 5, 1931 |
| Rose | 2,507,421 | May 9, 1950 |
| Mazelsky | 3,369,634 | February 20, 1968 |
| Chika | 4,217,970 | August 19, 1980 |
| Winiecki | 4,416,465 | November 22, 1983 |

The Price patent shows metal strips which appear to be attached to the side of an old type of automobile adjacent the running board.

The Rose patent shows a three-wheeled motorcycle with bars extending around the circumference.

Chika shows, in FIG. 4, a four-wheeled motorcycle with a rod-type frame.

SUMMARY OF THE INVENTION

A vehicle body protector for a vehicle includes a plurality of tubular members interconnected to each other and extending from the front to the rear of the vehicle in spaced relation to the side of the vehicle. A tubular rod is attached to the rear bumper of the vehicle. A first L-shaped tubular section is secured in one end of the rear tubular attachment rod while the other end of this L-shaped member extends forward from the rear of the vehicle alongside but removed from the side of the vehicle. A first straight tubular section having first and second ends is next provided, wherein the first end thereof fits around the outer end of the first L-shaped tubular section. A second straight tubular section is provided having first and second ends, wherein the first end thereof fits within the second end of the first straight tubular section. A third straight tubular section is bolted under the vehicle. A second L-shaped tubular section is provided having first and second ends wherein the first end thereof fits within the outer end of the third straight tubular section, and the second end thereof which extends upwardly alongside, but removed from the side of the vehicle. A third L-shaped tubular section is provided having a first end which fits around the second end of the second L-shaped tubular section and a second end which fits around the second end of the second straight tubular section. A front attachment comprising a front tubular attachment rod is provided. A bracket secures the front tubular attachment rod to the front bumper of the vehicle. A fourth L-shaped tubular section is provided having a first end which fits inside an end of the front tubular attachment rod and a second end which extends rearward from the front of the vehicle on the same side as the first L-shaped member. A fourth straight tubular section is provided having a first end which fits around the second end of the fourth L-shaped section. A fifth straight tubular section is provided having a first end which fits around the second end of the fourth straight tubular section and a second end which is secured to an upper portion of the second L-shaped section.

BRIEF DESCRIPTION OF THE DRAWINGS

FIG. 1 is a side elevation of a vehicle, shown somewhat diagramatically, illustrating the vehicle protector of the present invention;

FIG. 2 is an elevation of the front bumper only of the vehicle shown in FIG. 1 but further showing the attachments of the vehicle body protector to the front bumper;

FIG. 3 is a view similar to FIG. 2 but with respect to the rear bumper of the vehicle shown in FIG. 1;

FIG. 4 is a plan view of the portion of the body protector of the present invention which extends from the rear bumper to a point of connection on the vehicle forward and below the front door of the vehicle;

FIG. 5 is a side elevation looking along line 5—5 of FIG. 4 showing the attachment of one element to the under side of the vehicle;

FIG. 6 is an elevation looking along line 6—6 of FIG. 4;

FIG. 7 is a plan view of one of the elements attached to the front bumper together with associated structure;

FIG. 8 is a view looking along line 8—8 of FIG. 7 showing the portion of the present vehicle body protector which extends from the front bumper and connects with the rear portion at a location forward of the front door of the vehicle; and FIG. 9 is a sectional view taken along section line 9—9 of FIG. 3.

DETAILED DESCRIPTION OF THE PREFERRED EMBODIMENTS

The present invention includes a plurality of metal tubes, preferably made of aluminum, which are fitted or telescoped into each other to form a side bumper along the sides of an automobile or other vehicle and in spaced relation to the sides of the vehicle.

Although dimensions are indicated herein, it should be understood that dimensions are not critical, but are merely provided for illustrative purposes. It would be preferred that the metal rods or tubes disclosed herein would be 1/16 inch thick; however, any comparable or standard wall thickness for aluminum rods or tubing will suffice. Obviously, the aluminum tubing disclosed herein could be made in the precise dimensions indicated by conventional molding or extrusions process. On the other hand, standard size aluminum rods or tubing can be utilized providing the same or similar interfitting relationship is established.

Referring to the drawings in detail, FIG. 1 shows an automobile 10 having a front bumper 12 and a rear bumper 14. The body protector 16 of the present invention, which will be described in greater detail hereinafter, is shown as attached to the front and rear bumpers and to an intermediate point 17 just below and forward of the front door of the vehicle. Although it is not shown in this figure, it should be understood that the body protector 16 is spaced outwardly from the sides of the vehicle. If the vehicle of FIG. 1 were positioned in a parking lot, the body protector 16 would prevent damage to the sides and vehicle doors on the vehicle 10 if a door on an adjacent vehicle were opened wide enough to hit the body protector 16.

As shown in FIG. 3, a tube 18 is attached to the rear bumper 14 by means of a pair of clamps 46. As shown in FIG. 9, a pair of screws 48 at the ends of the clamp 46 can be screwed in so as to fit beneath the inner rear edges of the bumper 14 and thus hold the clamp 46 and the tube 18 to the bumper. Clamps 46 are preferably made from flat aluminum strips, approximately 15 inches long, 1 inch wide and 1/32 inch thick. These strips are sufficiently flexible to be bent into the shape shown in FIG. 9. The tube 18 will be approximately 5 feet long, ¾ inch o.d. with a wall thickness of about 1/16 inch.

Turning now to FIG. 4, an L-shaped member 20, also made from aluminum tubing has one end inserted into the right-hand end of the tubular rod 18. The member 20 has a ⅝ inch o.d. and is constructed from aluminum tubing approximately 1/16 inch thick. One leg is approximately 2½ feet long and the other leg is approximately 1 foot long. The 2½ foot leg is the one which is inserted into the tubular rod 18 so that the other leg can be spaced approximately 6 inches away from the side of the vehicle. The one foot long leg of the L-shaped member 20 is inserted into an elongated tubular rod 22 which is approximately 6 feet long with an outer diameter of about 1 inch and approximately 1/16 inch thick.

Another tubular member 24, approximately 6 feet long having a ⅞ inch o.d. and being approximately 1/16 inch thick is fitted into the the forward end of the tubular member 22. A short tubular rod 26, approximately 1 foot long, having a 1 inch o.d. and approximately 1/16 inch thick, is attached to the under side of the vehicle 10 by means of a bolt 42 which passes through diametrically opposite holes in the tube 26 and through an appropriate hole in the frame of the vehicle 10. A nut 44 is screwed onto the end of the bolt 42 to hold the tube 26 to the under side of the vehicle as shown in FIG. 5. This point of attachment corresponds with the position 17 shown in FIG. 1. An L-shaped member 28, having one leg approximately 2 feet long and another leg approximately 1 foot long, is connected to the tubular rod 26 by inserting the 1 foot leg into the outer end of the tubular member 26. The 2 foot leg of the L-shaped member 28 projects vertically upwardly about 6 inches away from the side of the vehicle 10. This L-shaped member 28 preferably has a ⅝ inch o.d. and is approximately 1/16 inch thick.

The top of the L-shaped member 28 is connected to the forward end of the tubular member 24 by means of a third L-shaped member 30 which has two short legs approximately 5 inches long. The L-shaped member 30 has a 1 inch o.d. and is preferably 1/16 inch thick. One end of the L-shaped member 30 is received over the top of the L-shaped member 28 and the other end of the L-shaped member 30 is received over the forward end of the tubular member 24.

Turning now to consideration of FIGS. 2, 7 and 8, the remaining portion of the body protector 16 is shown as extending from the forward end of the vehicle 10 to the structure just previously described. Two tubular rods 36 are secured to the left and right hand portions of the front bumper 12 by means of brackets 46 and screws 48 in substantially the same manner that the tubular member 18 is attached to the front bumper 14 as shown in FIG. 9. FIGS. 7 and 8 show the left-hand tubular member 36 and interconnecting elements 40, 34, and 32. Each tubular member 36 is approximately 1½ feet long, about ⅞ inch o.d., and approximately 1/16 inch thick. The member 40 is an L-shaped member having two legs, each approximately 1 foot long with an o.d. of about ⅝ inch and approximately 1/16 inch thick. One leg of the L-shaped member 40 is inserted into the outer end of the tubular member 36 so that the other leg of the member 40 is positioned approximately 6 inches away from the side of the vehicle. The other outer leg of the L-shaped member 40 is inserted into a forward end of a tubular member 34 which is approximately 3 feet long and having an outer diameter of ¾ inch. The rear end of the tubular rod 34 is inserted into the forward end of a tubular member 32 which is approximately 4 feet long with an outer diameter of about ⅞ inch. The rear end of the tubular member 32 is secured to a point adjacent the upper end of the L-shaped member 28 by means of a bolt 38 (see now FIG. 6) which extends through corresponding aligned holes 41 in the tubular member 32 and through aligned holes in the L-shaped member 28. The inner end of the bolt 38 is held in position by means of a cotter pin 39 which can be readily removed so as to permit easy withdrawal of the bolt 38.

Although the elements shown and described in FIG. 4 through 8 represent the portion of the body protector 16 on the right hand side of the vehicle 10 (the portion visible in FIG. 1), it should be understood that the same arrangement would be employed on the opposite side of the vehicle. Thus, a tubular member identical to tubular member 26 will be bolted to the under side of the vehicle on the opposite side thereof corresponding to the position 17. Duplicates will be provided of elements 20, 22, 24, 28, 30, 32, 34, 38, 39 and 40 on the opposite side of the vehicle. These elements will be interconnected in essentially the same manner as shown in FIGS. 4 through 8.

Whereas the present invention has been described in particular relation to the drawings attached hereto, it should be understood that other and further modifications, apart from those shown or suggested herein, may be made within the spirit and scope of this invention.

What is claimed is:

1. A vehicle body protector comprising a rear attachment means including a rear tubular attachment rod having first and second ends, means securing said rear tubular attachment rod to the rear of the vehicle, a first L-shaped tubular section having a first end which is secured in the first end of said rear tubular attachment rod and a secnd end which extends forward from the rear of said vehicle alongside of said vehicle and is spaced from the side of said vehicle, a first straight tubular section having first and second ends, wherein the first end thereof fits around the second end of said first L-shaped tubular section, a second straight tubular section having first and second ends, wherein the first end thereof fits within the second end of said first straight tubular section, a third straight tubular section bolted under the vehicle, a second L-shaped tubular section having first and second ends wherein the first end thereof fits within the outer end of said third straight tubular section, and the second end thereof which extends upwardly alongisde of said vehicle and is spaced from the side of said vehicle, a third L-shaped tubular section having a first end which fits around the second end of said second L-shaped tubular section and a second end of which fits around the second end of said second straight tubular section, a front attachment means comprising a front tubular attachment rod, means securing said front tubular attachment rod to the front of said vehicle, a fourth L-shaped tubular section having a first end which fits inside an end of said front tubular attachment rod and a second end which extends rearward from the front of said vehicle on the same side as said first L-shaped means, a fourth straight tubular means having a first end which fits around the second end of said fourth L-shaped section, and a fifth straight tubular means having a first end which fits around the second end of the fourth straight tubular means and a second end which is secured to an upper portion of the second L-shaped section.

* * * * *